United States Patent [19]

Elder et al.

[11] 4,038,605
[45] July 26, 1977

[54] MESSAGE PREAMBLE DETECTOR

[75] Inventors: James H. Elder, Brookneal; Hubert A. Patterson, Lynchburg, both of Va.

[73] Assignee: General Electric Company, Lynchburg, Va.

[21] Appl. No.: 664,085

[22] Filed: Mar. 5, 1976

[51] Int. Cl.² .......................... H03K 5/153; H03K 5/18
[52] U.S. Cl. ....................................... 328/119; 178/88; 307/233 R; 307/362; 328/136; 328/138; 328/140; 325/321
[58] Field of Search ................... 307/233, 234, 235 N, 307/269, 235 T; 328/63, 72, 119, 136, 138, 139, 140, 167, 179; 178/69.5 R, 69.5 F, 69.5 G, 88; 325/321

[56] References Cited

U.S. PATENT DOCUMENTS

| 3,508,160 | 4/1970 | Poumakis | 328/119 |
|---|---|---|---|
| 3,544,723 | 12/1970 | Battista | 328/138 X |
| 3,705,315 | 12/1972 | Clark | 307/269 |
| 3,825,842 | 7/1974 | Birchfield et al. | 328/140 |

Primary Examiner—John Zazworsky
Attorney, Agent, or Firm—James J. Williams

[57] ABSTRACT

Binary messages received over a radio channel are subject to fading or noise degradation because of the radio channel. Accordingly, a predetermined binary preamble followed by a synchronizing word are transmitted ahead of the message. In order that the synchronization be correct, the end of the preamble should be determined as accurately as possible. This is achieved by fast and slow detectors which receive the preamble. The fast detector output is applied to a time delay. The slow detector and the time delay outputs are applied to an output circuit which produces an output signal in response to the slow detector and the time delay outputs both being present. The fast and slow detectors and the time delay are arranged so that the output signal is produced at the desired time after the preamble begins, thereby accurately indicating when the synchronizing word is to begin.

6 Claims, 4 Drawing Figures

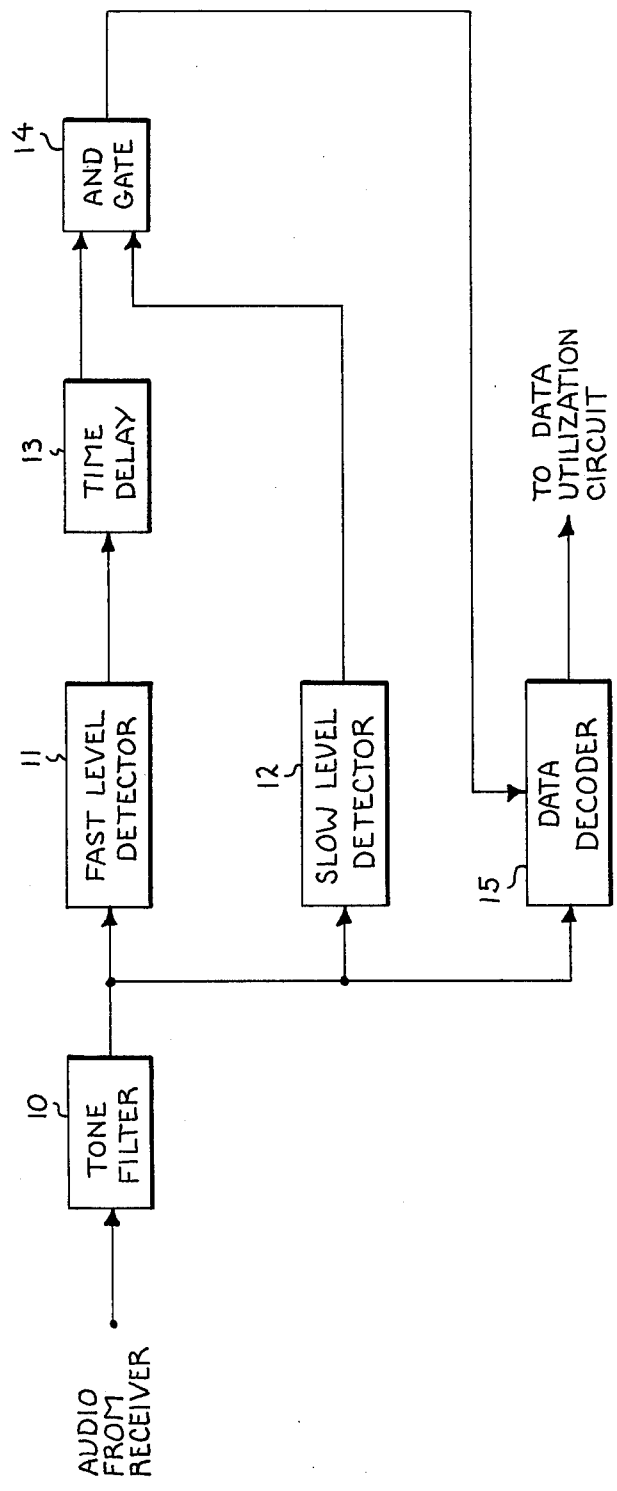

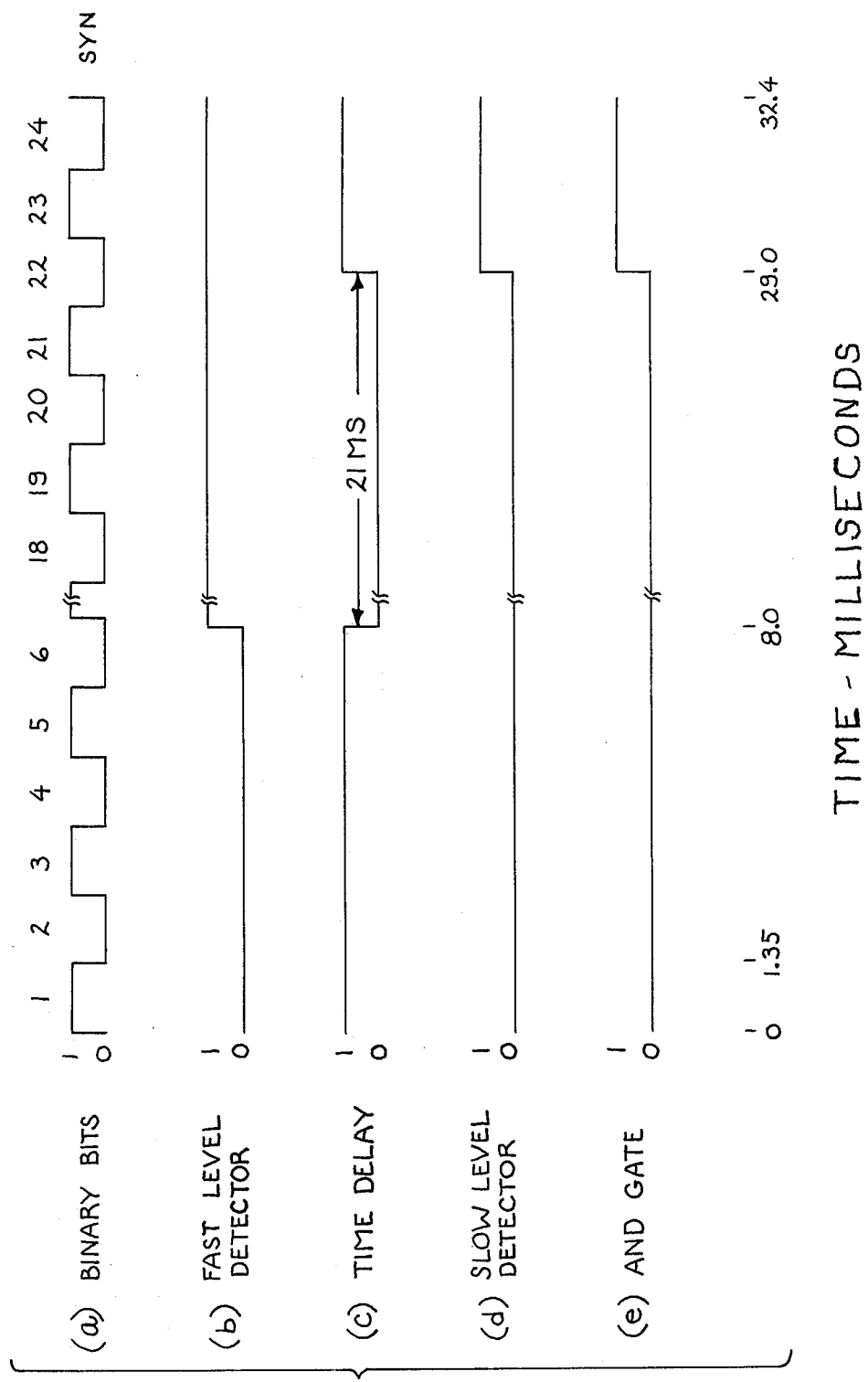

MESSAGE PREAMBLE DETECTOR

BACKGROUND OF THE INVENTION

Our invention relates to a message preamble detector, and particularly to a message preamble detector for providing an output signal after the preamble has been present for a selected time.

In radio and other types of electrical communication, binary signals are used to indicate information or to make an inquiry. For example, in a radio communication system, one station (such as a fixed station) may wish to know the status or condition of a second station (such as a mobile station). While the operator of the one station can make this inquiry by voice, such a procedure takes time, and if the operator of the second station is busy or absent, such a procedure is inefficient, or in some cases useless. For these and other reasons, binary systems have been provided to send predetermined messages or inquiries, and to send responsive replies. As persons familiar with this field know all to well, transmitted binary messages, inquiries, and replies are relatively susceptible to noise in any communication path, and are very susceptible to noise and fading if the communication path uses radio. In order that the binary messages, inquiries, and replies can be sent as reliably as possible, they are usually provided with a preamble to alert the receiving apparatus when a synchronizing word is to follow. With such an indication, the receiving apparatus will be synchronized with the transmitting apparatus so that the binary message will be accurately received.

Accordingly, a primary object of our invention is to provide a new and improved message preamble detector.

Another object of our invention is to provide a new and improved message preamble detector that is less susceptible to noise and fading on the communication path carrying the message.

SUMMARY OF THE INVENTION

Briefly, these and other objects are achieved in accordance with our invention by a preamble detector having a fast level detector that quickly responds to a preamble signal and starts a time delay circuit, and by a slow level detector that responds to a preamble signal after a time substantially equal to the response time of the fast detector and the time delay. An output circuit is connected to the slow level detector and the time delay and produces an output signal after the slow level detector and the time delay produce signals. This output signal accurately indicates that the preamble was detected and when the synchronizing word is to begin.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIG. 1 shows a message format with which our invention can be used;

FIG. 2 shows a diagram of one preferred embodiment of a message preamble detector in accordance with our invention;

FIG. 3 shows waveforms for illustrating the operation of a message preamble detector in accordance with our invention.

DESCRIPTION OF A PREFERRED EMBODIMENT

Figure 4:
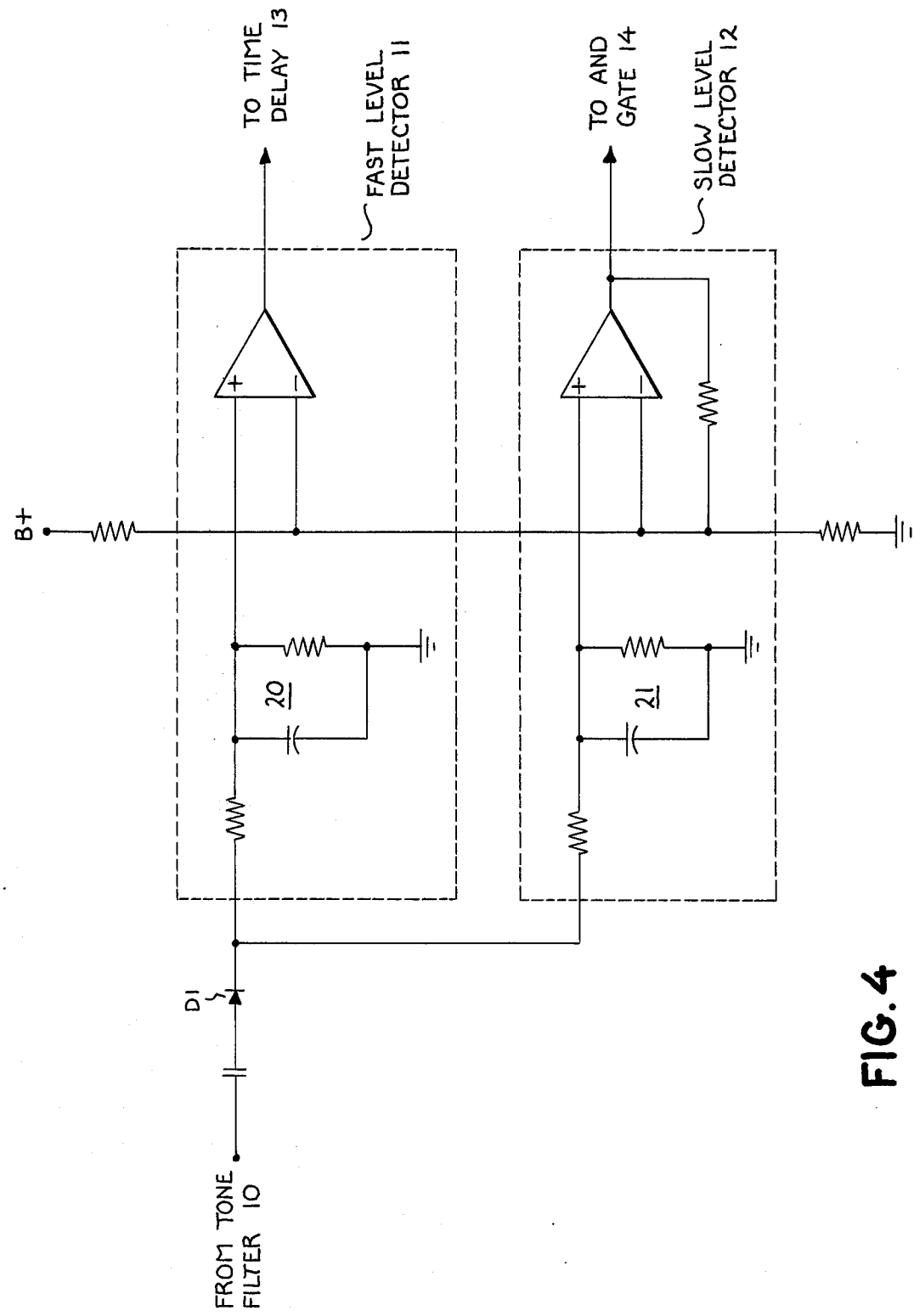
FIG. 4 shows a more detailed schematic diagram of a portion of our message preamble detector of FIG. 2.

As mentioned, binary signals are utilized in communication systems, particularly radio, to transmit messages, make inquiries, and make replies. Such binary signals operate between two levels, generally designated zero and one. These levels may be represented by any suitable voltage, and if the binary messages are to be transmitted over a communication path such as a radio, it is desirable that these binary levels be represented by two frequencies. The two frequencies makes modulation and demodulation much easier. While it is not essential, it is preferred that these frequencies be in the audio range. By way of example, we have assumed that a binary 0 is represented by one cycle of a 740 Hertz wave, and a binary 1 is represented by two cycles of a 1480 Hertz wave. However, these frequencies may be varied in accordance with individual design preferences or necessities.

In FIG. 1, we have shown one example of a binary message for which our invention is provided. This binary message begins with a preamble which we have assumed to be 24 binary bits of alternate 1's and 0's as illustrated in FIG. 3a. This preamble is desirable or essential where a message or inquiry is to be transmitted only one time, since it will alert receiving apparatus that a synchronizing word and message are to follow, and prepare the receiving apparatus for that word message. Following the preamble, a synchronizing word (SYN) is transmitted, followed by a first address word (ADD 1) transmitted three times. Then, a second synchronizing word that is the logic inversion of the first synchronizing word ($\overline{SYN}$) is transmitted. This second synchronizing word ($\overline{SYN}$) is followed by a second address word (ADD 1'). Then, a third synchronizing word ($\overline{SYN}$), a first message word (MSG 1), a fourth synchronizing word (SYN), and a second message word (MSG 1') are transmitted. These words may have any desired binary pattern. While the format of FIG. 1 is given as an example only, it is important to recognize that because the message, inquiry, or reply is indicated by logic 1's and 0's (or by two frequencies), it is essential that the receiving apparatus know precisely when the first synchronizing word begins. If this is not known or quickly determined, the entire meaning or intent of the message will be lost. For this and other reasons, the preamble is supplied at the beginning of a message.

As persons skilled in the art will recognize, however, the preamble is subjected to noise or fading over many communication paths. Accordingly, it is very desirable, if not essential, that the preamble detector indicate precisely when the preamble ends so that the receiving apparatus will know when the first synchronizing word (SYN) begins. The reason it is desirable to detect the preamble accurately near the end of the preamble sequence is to maximize the probability of correctly receiving the synchronizing word which follows the preamble. That is, if the preamble is detected early, when the last few bits of the preamble are examined by the synchronizing word detector. Each bit has a probability of error determined by the received signal to noise ratio. If some of the final preamble bits are changed by noise, the may be misinterpreted as the synchronizing word by the synchronizing word detector which has very little noise immunity. Thus there is a higher probability that synchronizing would occur on the wrong bit and the message would be lost. A detector which meets these needs and which is constructed in accordance with our invention is shown in block diagram form in FIG. 2. In FIG. 2, we have assumed that the detector is operating within a radio receiver having the usual equipment which demodulates the received signals and supplies audio tones representing the 24 alternate 1's and 0's shown in FIG. 3a. If, as mentioned earlier, the 0's are represented by one cycle of a 740 Hertz wave and the 1's are represented by two cycles of a 1480 Hertz wave, the 24 alternate 1's and 0's forming the preamble have a duration of 1.35 milliseconds each, and the preamble has a duration of 32.4 milliseconds. This end of the preamble should be accurately determined. The alternating 740 and 1480 Hertz waves produce a composite wave of 1110 Hertz which can be detected by a narrow band tone filter 10 tuned to 1110 Hertz. Signals of other frequencies are rejected. The 1110 Hertz signals passed by the filter 10 are applied to a fast level detector 11 and to a slow level detector 12. The fast level detector 11 is arranged to produce a direct current signal in response to the 1110 Hertz signals approximately 8 milliseconds after the first 1110 Hertz signal is received. The slow level detector 12 is arranged to produce an output signal approximately 29 milliseconds following receipt of the first 1110 Hertz signal. The output from the fast level detector 11 is applied to a time delay circuit 13 which is arranged to produce an output approximately 21 milliseconds following receipt of a signal from the fast level detector 11. The output from the time delay 13 and the output from the slow level detector 12 are applied to the two inputs of an AND gate 14. If both inputs to the AND gate 14 are at the appropriate logic level, assumed to be a logic 1, then the AND gate 14 produces an output signal which can be utilized in any way desired to indicate that the preamble has been requisite length of time. This output signal can be applied, for example, to a data decoder 15 so as to render the decoder 15 operable. When the decoder 15 is rendered operable, subsequent signals from the tone filter 10 representing the remainder of the message format shown in FIG. 1 can be utilized by the data decoder 15 to produce an accurate output.

With reference to FIG. 3, these wave forms are plotted along a common time axis. FIG. 3a shows the 24 binary bits (omitted between bits 6 and 18) forming the preamble; FIG. 3b shows the output of the fast level detector 11; FIG. 3c shows the output of the time delay 13; FIG. 3d shows the output of the slow detector 12; and FIG. 3e shows the output of the AND gate 14. When the 1110 Hertz signals representing the binary bits are supplied to the detector 11, it produces an output after approximately 8 milliseconds. This output starts the operation of the time delay 13 for its 21 millisecond timing period. The slow level detector 12 produces an output after approximately 29 milliseconds. When the output from the slow level detector 12 and the output from the time delay 13 are produced and simultaneously present, the AND gate 14 produces an output as shown. Such an arrangement prevents an output from being produced too soon after receipt of the preamble, and reduces the effects of noise and fading over the communication path.

Persons skilled in the art will appreciate that various circuits may be used in the block diagram of FIG. 3. The tone filter 10 may be any suitable filtering circuit. The detectors 11, 12 may be any type of arrangement which rectifies the tones and produces a direct current signal at some predetermined time following receipt of the tone. FIG. 4 shows one example of a diagram of such detectors. Signals from the tone filter 10 ae rectified by a diode D1 and applied to the detectors. Each of the detectors utilize a respective integrator or filter 20, 21 having a capacitor whose magnitude determines the length of time required for a charge to be built up. The voltages representing this charge are respectively applied to the plus input of operational amplifiers. A reference voltage is supplied by a suitable voltage divider and connected to the minus input of the two amplifiers. When the capacitor charge voltage exceeds the reference voltage, the operational amplifier produces an output such as represented by a voltage change. The time delay 13 may, for example, be a one shot or monostable multivibrator having a predetermined time delay. And, of course, the AND gate 14 is a well known circuit element.

It will thuse be seen that our invention provides an improved preamble detector because of the fact that noise variations in the received signal cause percentage variations in the normal operating time of a detector. For example, a fast detector which operates quickly (say in 8 milliseconds) would vary ± 0.8 milliseconds in its operate time for a 10% noise variation, and a slow detector which operates slowly (say in 28 milliseconds) would vary ± 2.9 milliseconds in its operate time for the same 10% noise variation. Thus, a fast detector provides more accurate timing than a slow detector for a given percentage noise variation. However, a fast detector is more susceptible to a false signal because of its shorter operate time. We have, therefore, combined the two detectors to obtain the time accuracy of the fast detector and the low sensitivity of a slow detector to false signals, and provide a preamble detector that is very likely to detect at the proper and desired time with little chance of responding to false signals. Although we have described our invention with reference to a particular message format and a preamble having a predetermined number of pulses of selected duration, persons skilled in the art will appreciate that our detector can be used with preambles represented by other sequences of logic 1's and 0's, and by other time durations. In any case, our detector can be used with such preambles by adjustment of the timing of the two detectors 11, 12 and the time delay 13. Therefore, while our invention has been described with reference to a particular embodiment, it is to be understood that modifications may be made without departing from the spirit of the invention or from the scope of the claims.

What we claim as new and desire to secure by Letters Patent of the Unites States is:

1. An improved arrangement for detecting signals representing a binary sequence and having a predetermined time duration, said arrangement comprising:
   a. an input terminal for said signals;
   b. a fast level detector connected to said input terminal for producing a fast detection signal after a predetermined first time period following receipt of said signals;
   c. a time delay circuit connected to said fast level detector for producing a delayed signal after a predetermined second time period following receipt of said fast detection signal;

d. a slow level detector connected to said input terminal for producing a slow detection signal after a predetermined third time period following receipt of said signals;

e. said third time period being substantially equal to the sum of said first and second time periods;

f. and means connected to said time delay circuit and to said slow level detector for producing an output signal in response to the simultaneous presence of said delayed signal and said slow detection signal.

2. The improved arrangement of claim 1 wherein said third time period is less than said predetermined time duration.

3. An improved circuit for detecting a message preamble having a selected number of binary representative signals, said improved circuit comprising:

a. an input for said binary representative signals;

b. a fast detector connected to said input for producing an output signal within a first time period following receipt of said binary representative signals;

c. a slow detector connected to said input for producing an output signal within a second time period following receipt of said binary representative signals, said second time period being greater than said first time period;

d. a time delay circuit connected to said fast detector for producing an output signal a delayed time period following receipt of said fast detector output signal;

e. said first time period plus said delayed time period being substantially equal to said second time period;

f. and means connected to said slow detector and to said time delay circuit for producing an output signal in response to the simultaneous presence of said time delay circuit output signal and said slow detector output signal.

4. The improved circuit of claim 3 wherein said second time period is less than the time required for said selected number of binary representative signals.

5. The improved circuit of claim 3 wherein said fast and slow detectors include voltage integrator circuits and a voltage reference circuit.

6. The improved circuit of claim 5 wherein said second time period is less than the time required for said selected number of binary representative signals.

* * * * *

UNITED STATES PATENT OFFICE
CERTIFICATE OF CORRECTION

Patent No. 4,038,605          Dated July 26, 1977

Inventor(s) James H. Elder and Hubert A. Patterson

It is certified that error appears in the above-identified patent and that said Letters Patent are hereby corrected as shown below:

Column 3, line 41, after "has been" insert -- received for a --

Column 4, line 8, cancel "ae" and insert -- are --

Column 4, line 24, cancel "thuse" and insert -- thus --

Column 4, line 31, cancel "28" and insert -- 29 --

Signed and Sealed this

Thirteenth Day of June 1978

[SEAL]

Attest:

RUTH C. MASON
Attesting Officer

DONALD W. BANNER
Commissioner of Patents and Trademarks